(12) United States Patent
Thompson

(10) Patent No.: US 10,352,663 B2
(45) Date of Patent: Jul. 16, 2019

(54) BASE FOR TARGET SHOOTING

(71) Applicant: Christopher Maurice Thompson, Pineville, MO (US)

(72) Inventor: Christopher Maurice Thompson, Pineville, MO (US)

( * ) Notice: Subject to any disclaimer, the term of this patent is extended or adjusted under 35 U.S.C. 154(b) by 0 days.

(21) Appl. No.: 15/953,309

(22) Filed: Apr. 13, 2018

(65) Prior Publication Data
US 2018/0299232 A1     Oct. 18, 2018

Related U.S. Application Data

(60) Provisional application No. 62/485,795, filed on Apr. 14, 2017.

(51) Int. Cl.
*F41J 1/10* (2006.01)
*F41J 7/04* (2006.01)
*F16M 11/24* (2006.01)

(52) U.S. Cl.
CPC .............. *F41J 1/10* (2013.01); *F16M 11/24* (2013.01); *F41J 7/04* (2013.01); *F16M 2200/08* (2013.01)

(58) Field of Classification Search
CPC ............. G09F 15/0062; F41J 1/10; F41J 1/00
USPC ...... 40/607.01, 606.01, 610, 606.18, 607.03, 40/611.01, 611.08; 273/407, 403, 406, 273/408; 182/181.1, 186.4, 186.5; 248/165
See application file for complete search history.

(56) References Cited

U.S. PATENT DOCUMENTS

| | | | | |
|---|---|---|---|---|
| 4,433,753 A * | 2/1984 | Watson | ................... | B25H 1/06 182/151 |
| 4,520,584 A * | 6/1985 | Howard | .............. | G09F 15/0056 40/124.19 |
| 5,526,897 A * | 6/1996 | Schiller | ................ | B23D 47/025 182/129 |
| 5,606,815 A * | 3/1997 | Feldwhere | .......... | G09F 15/0006 40/607.03 |
| 5,878,518 A * | 3/1999 | Grewe | ................ | G09F 15/0056 248/910 |
| 6,412,743 B1 * | 7/2002 | Fell | ........................ | A47F 5/0815 248/346.03 |
| 6,808,152 B2 * | 10/2004 | Fell | ........................ | A47F 5/0815 248/441.1 |
| 7,325,808 B1 * | 2/2008 | Adler | ........................ | F41J 1/08 273/406 |
| 7,584,563 B2 * | 9/2009 | Hillstrom | ............ | G09F 15/0056 248/346.2 |
| 2003/0168813 A1 * | 9/2003 | Wilkus | ....................... | F41J 1/10 273/407 |

(Continued)

*Primary Examiner* — Mark S Graham
(74) *Attorney, Agent, or Firm* — Klarquist Sparkman, LLP

(57) ABSTRACT

A target shooting base can have a shape that generally defines a triangular prism. The base can have a first end member, a second end member, a first side extending between the first and second end members, a second side extending between the first and second end members, a top member extending between a top portion of first end member and a top portion of the second end member, and a lower support member extending between an intermediate portion of first end member and an intermediate portion of the second end member. The top member and the lower support member can include a plurality of openings that can receive portions of a shooting target.

11 Claims, 5 Drawing Sheets

(56) References Cited

U.S. PATENT DOCUMENTS

| | | | |
|---|---|---|---|
| 2009/0315265 A1* | 12/2009 | Ball | F41J 1/10 273/407 |
| 2014/0252719 A1* | 9/2014 | Johnson | F41J 1/10 273/407 |
| 2015/0137455 A1* | 5/2015 | Pixton | F41J 1/10 273/407 |
| 2015/0292842 A1* | 10/2015 | Pixton | F41J 1/10 273/407 |

* cited by examiner

BASE FOR TARGET SHOOTING

CROSS REFERENCE TO RELATED APPLICATION

This application claims the benefit of U.S. Provisional Patent Application No. 62/485,795, filed Apr. 14, 2017, which is incorporated herein by reference in its entirety.

FIELD

This disclosure generally relates to target shooting and, more particularly, to a base for securing and displaying various target shooting systems.

BACKGROUND

Target shooting is a sport enjoyed by many gun and weapon enthusiasts. Shooting targets come in many different types, sizes, and forms. Because of the variety of target types available, target shooting systems that can accommodate different types of targets are very desirable.

SUMMARY

In some embodiments, a target shooting base is provided that can support one or more targets. The target shooting base can include a first end member and a second end member, a first side extending between the first and second end members, the first side being secured to the first and second end members, a second side extending between the first and second end members, the second side being secured to the first and second end members, a top member extending between a top portion of first end member and a top portion of the second end member, and a lower support member extending between an intermediate portion of first end member and an intermediate portion of the second end member. The top member and the lower support member can include a plurality of openings that can receive portions of a shooting target. The first end member, the second end member, the first side, and the second side can generally define a triangular prism shape.

In some embodiments, the plurality of openings in the top member are generally vertically aligned with the plurality of openings in the lower support member. The plurality of openings in the top member are the same size as the plurality of openings in the lower support member. Alternatively, the plurality of openings in the top member are larger in diameter than the plurality of openings in the lower support member.

The first end member, the second end member, the first side, the second side, and the top member can generally define a truncated triangular prism shape. In some embodiments, the top member can be integrally formed with the first side of the target shooting base to provide improved structural integrity and/or reduce the number of components.

In some embodiments, the first side is the shooter-facing side and a thickness of the first side can be greater than a thickness of the second side. The lower support member can include a plurality of tabs extending therefrom and the first end member and the second end member comprise a plurality of corresponding openings configured to receive the plurality of tabs extending from the lower support member to secure the lower support member between the first and second end members.

For convenience in moving or repositioning the base system, at least one gripping aperture in each of the first and second end members. The manner in which the plurality of openings in the top and lower support members can vary. For example, in some embodiments, the plurality of openings in the top member can be spaced apart from one another in a uniform manner. In another embodiment, the plurality of openings in the top member are not spaced apart from one another in a uniform manner. In yet another embodiment, the plurality of openings in the top member comprise several sets of different numbers of uniformly-spaced openings that are spaced apart from one another. The number of openings in the top member (and the bottom member) can be greater than 10, or in some cases, greater than 20.

DETAILED DESCRIPTION

Figure 1:
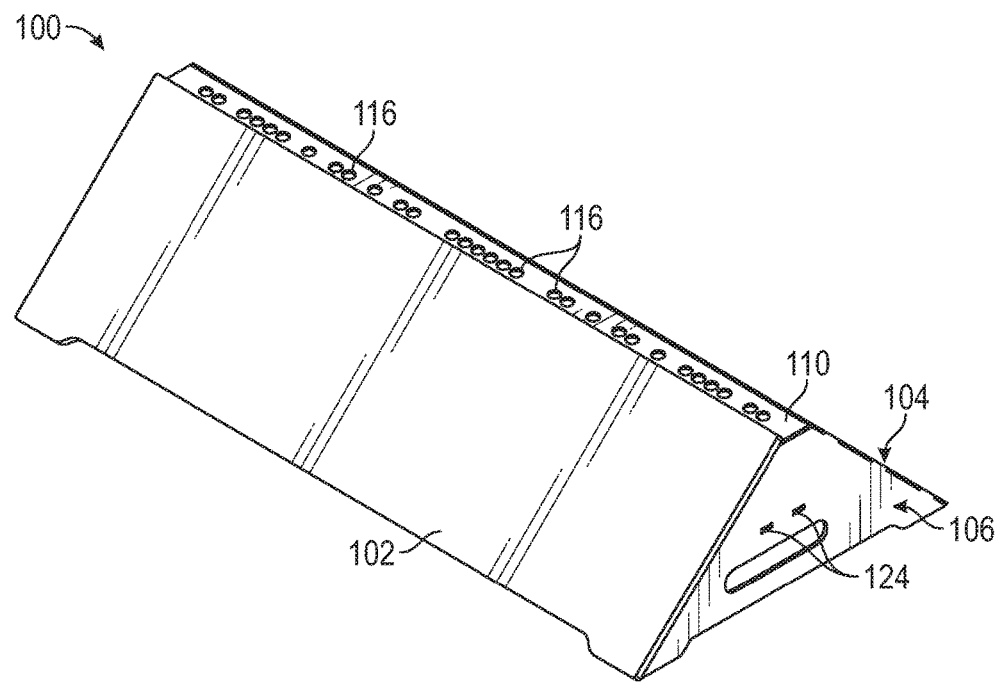
FIG. 1 shows a perspective view of an exemplary base system for securing one or more shooting targets.

For purposes of this description, certain aspects, advantages, and novel features of the embodiments of this disclosure are described herein. The described methods, systems, and apparatus should not be construed as limiting in any way. Features, characteristics, and/or groups described in conjunction with a particular aspect, embodiment or example are to be understood to be applicable to any other aspect, embodiment or example described herein unless incompatible therewith. All of the features disclosed in this specification (including any accompanying claims, abstract, and drawings), and/or all of the steps of any method or process so disclosed, may be combined in any combination, except combinations where at least some of such features and/or steps are mutually exclusive. The disclosure is not restricted to the details of any foregoing embodiments. The disclosure extends to any novel one, or any novel combination, of the features disclosed in this specification (including any accompanying claims, abstract, and drawings), or to any novel one, or any novel combination, of the steps of any method or process so disclosed.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods, systems, and apparatus can be used in conjunction with other systems, methods, and apparatus.

The explanations of terms and abbreviations herein are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

As used herein, the term "and/or" used between the last two of a list of elements means any one of, or any combination e of, the listed elements. For example, the phrase "A, B, and/or C" means "A," "B," "C," "A and B," "A and C," "B and C," or "A, B, and C."

As used herein, the terms "attached" and "coupled" generally mean physically connected or linked, and do not exclude the presence of intermediate elements between the attached/coupled items unless specifically stated to the contrary.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the detailed description, claims, abstract, and drawings.

Figure 3:
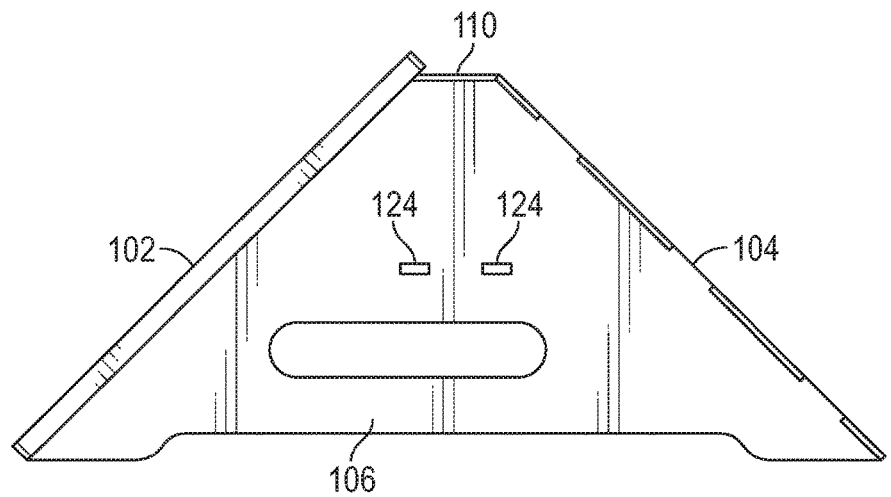
FIG. 3 shows a side view of the exemplary base system of FIG. 1.

FIG. 1 illustrates a base 100 for a shooting system. Base 100 can form a triangular prism, with a pair of generally rectangular sides 102, 104 and two generally triangular end members 106, 108. A top member 110 can be provided, thereby truncating the triangular prism shape of base 100. As shown in FIGS. 1 and 3, for example, sides 106, 108 are generally triangular, with a flattened top sides 112, 114 that correspond to the shape of the truncated triangular prism.

Figure 2:
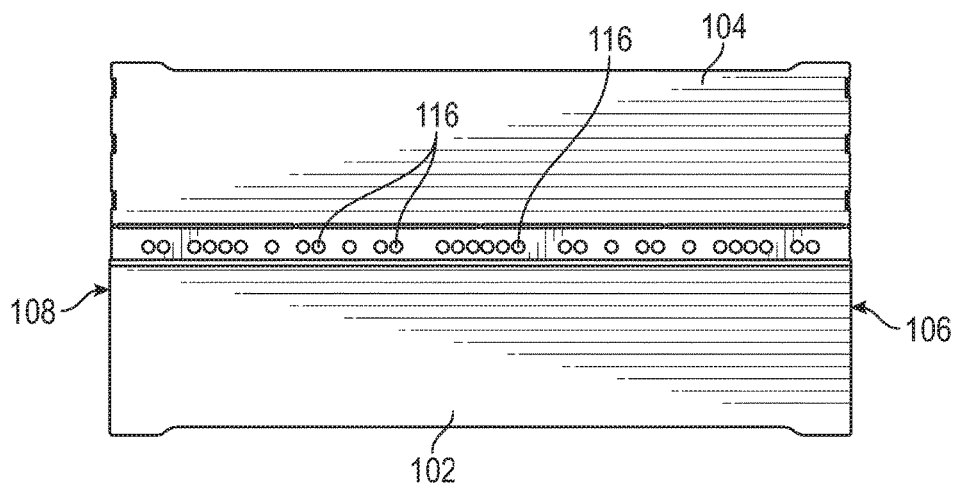
FIG. 2 shows a top view of the exemplary base system of FIG. 1.
Figure 6:
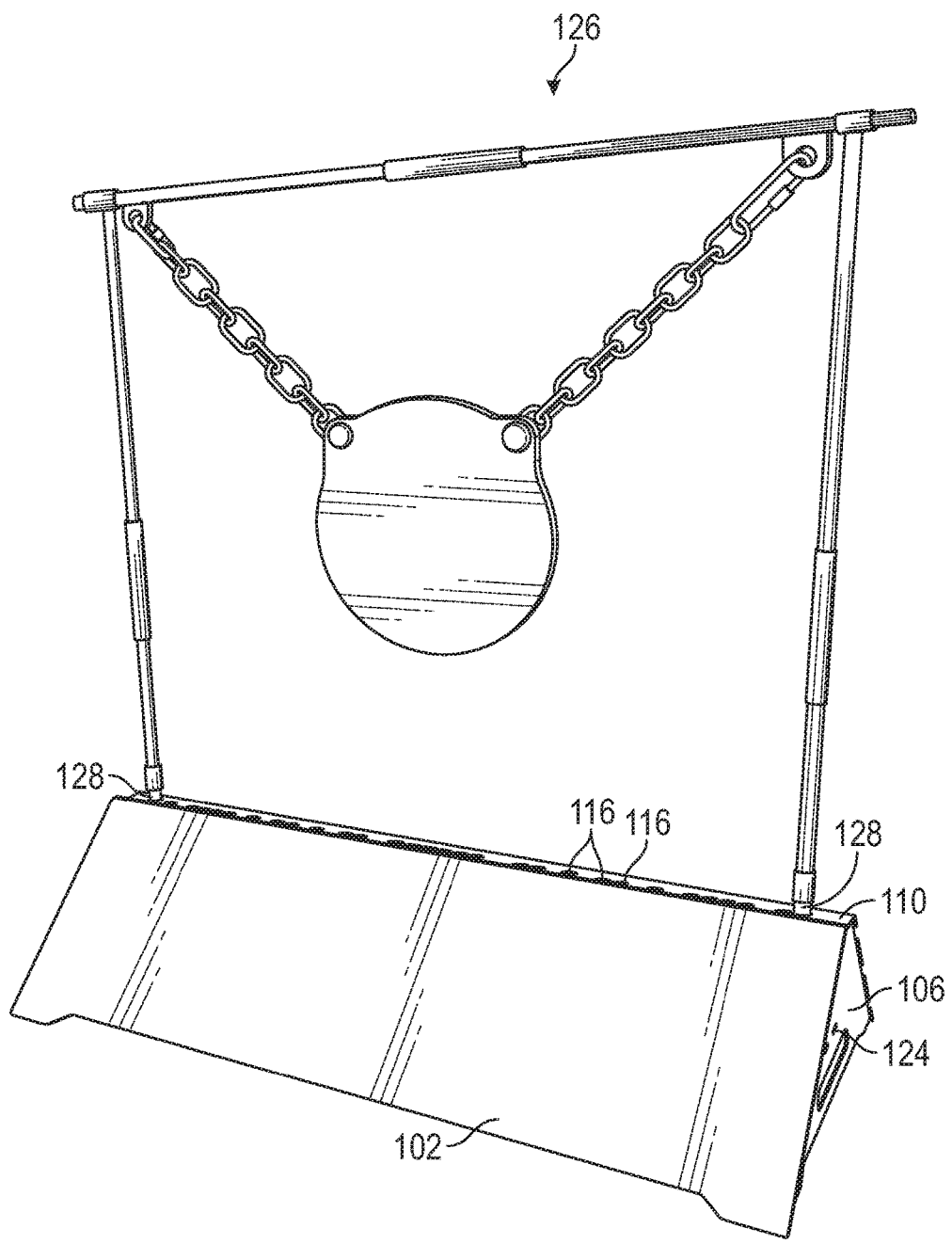
FIG. 6 shows a perspective view of the exemplary base system of FIG. 1 with a shooting target secured thereto.
Figure 7:
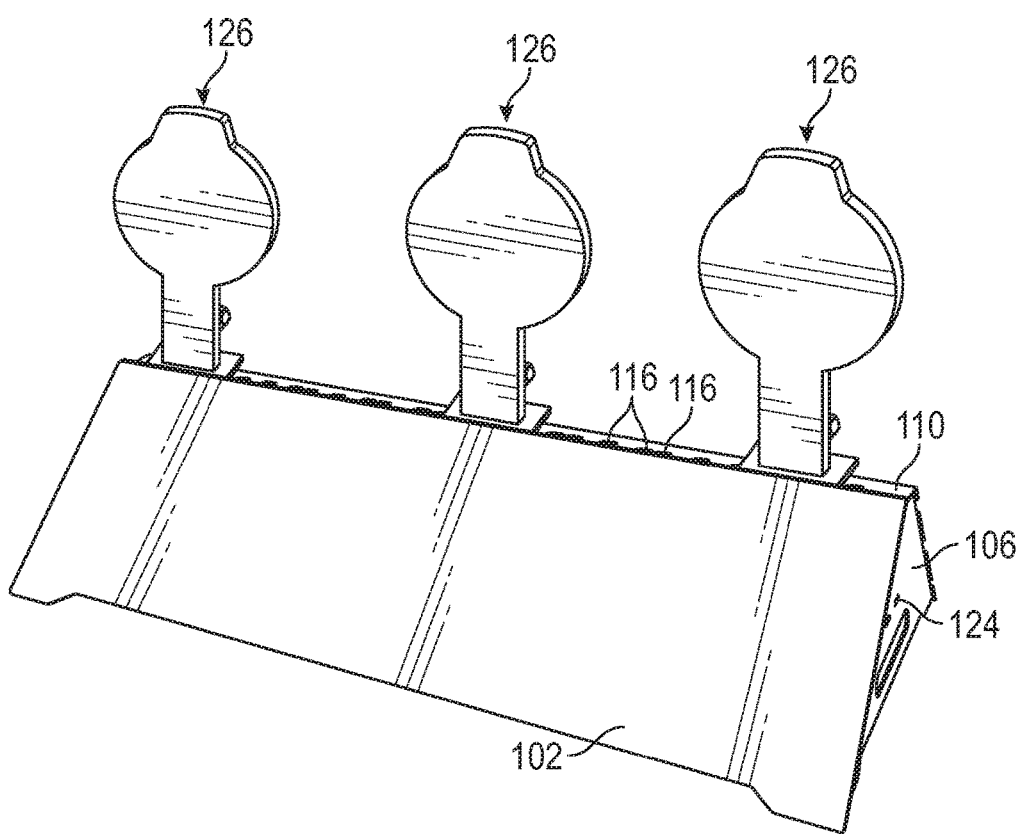
FIG. 7 shows a perspective view of the exemplary base system of FIG. 1 with a plurality of shooting targets secured thereto.

As shown in FIG. 2, top member 110 can have a plurality of openings 116 configured to receive a portion of a target. The plurality of openings can be spaced from one another in a variety of manners. In one embodiment, the plurality of openings can have the same spacing between adjacent openings along the length of top member 110. Alternatively, as shown in FIG. 2, the spacing can vary between some or all of the adjacent openings. By providing a plurality of openings, spaced along the length of top member 110, the base 100 can accommodate one target with a width that extends the length of the top member (e.g., FIG. 6) or it can accommodate a plurality of different targets along the length of the top member (e.g., FIGS. 5 and 7).

In particular embodiments, the openings can be positioned in groupings that are spaced apart from one another. For example, groups of openings (such as groupings of openings numbering between 2-10) can be separated by a space that is at least three times the distance between adjacent groupings, or in some embodiments, 4 or 5 times the spacing. In the embodiment shown in FIG. 1, a plurality of groupings with varied numbers of openings (e.g., 1, 2, 4, and 6) are provided.

Figure 4:
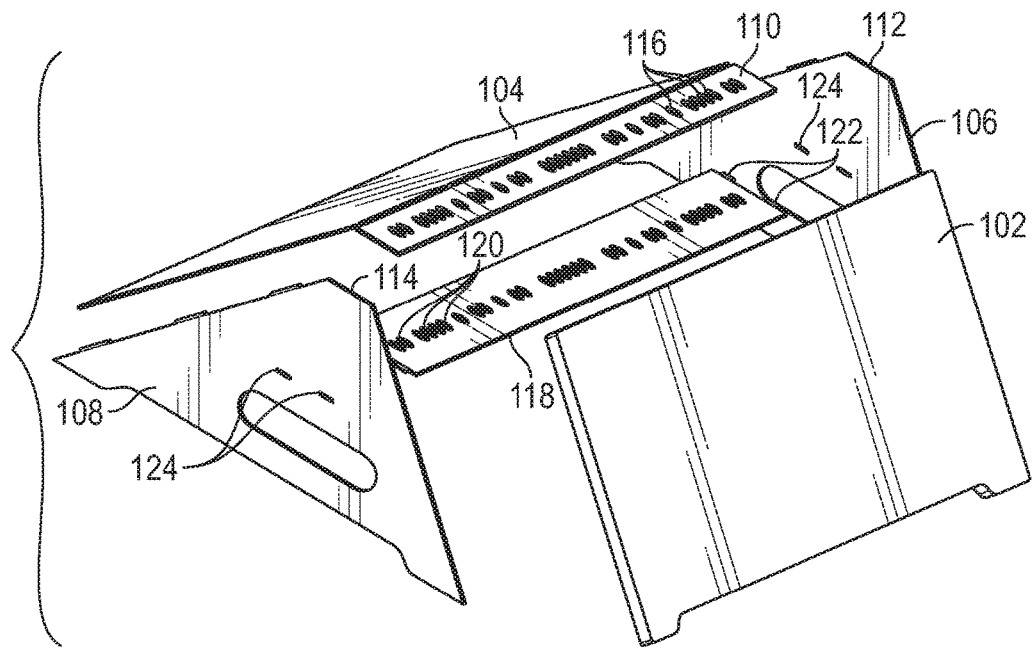
FIG. 4 shows an exploded view of the exemplary base system of FIG. 1.

Referring to FIGS. 3 and 4, a lower support member 118 can be provided below top member 110. Lower support member 118 can be configured with a plurality of openings 120, generally corresponding in location (vertically) to the openings provided in top member 110. Thus, when secured below top member 110, a portion of a target can be secured to the base 100 by extending that portion through one or more openings in top member 110 and one or more corresponding openings in support member 118.

Assembly of base 100 can be performed in various manners. In one embodiment, the top member 110 can be integrally formed with side 104. The integral top member 110/side 104 element can be secured to end members 106, 108 in any known manner (e.g., welding, pre-formed snap-fit connections, etc.). One of sides 102, 104, such as side 102 as shown in FIG. 3, can be formed with an increased thickness to provide greater strength and durability to the side of the base that faces the shooter.

Support member 118 can be secured to the base by one or more tabs 122 that extend from support member 118. Tabs 122 are sized to be received in corresponding openings 124 in end members 106, 108.

Figure 5:
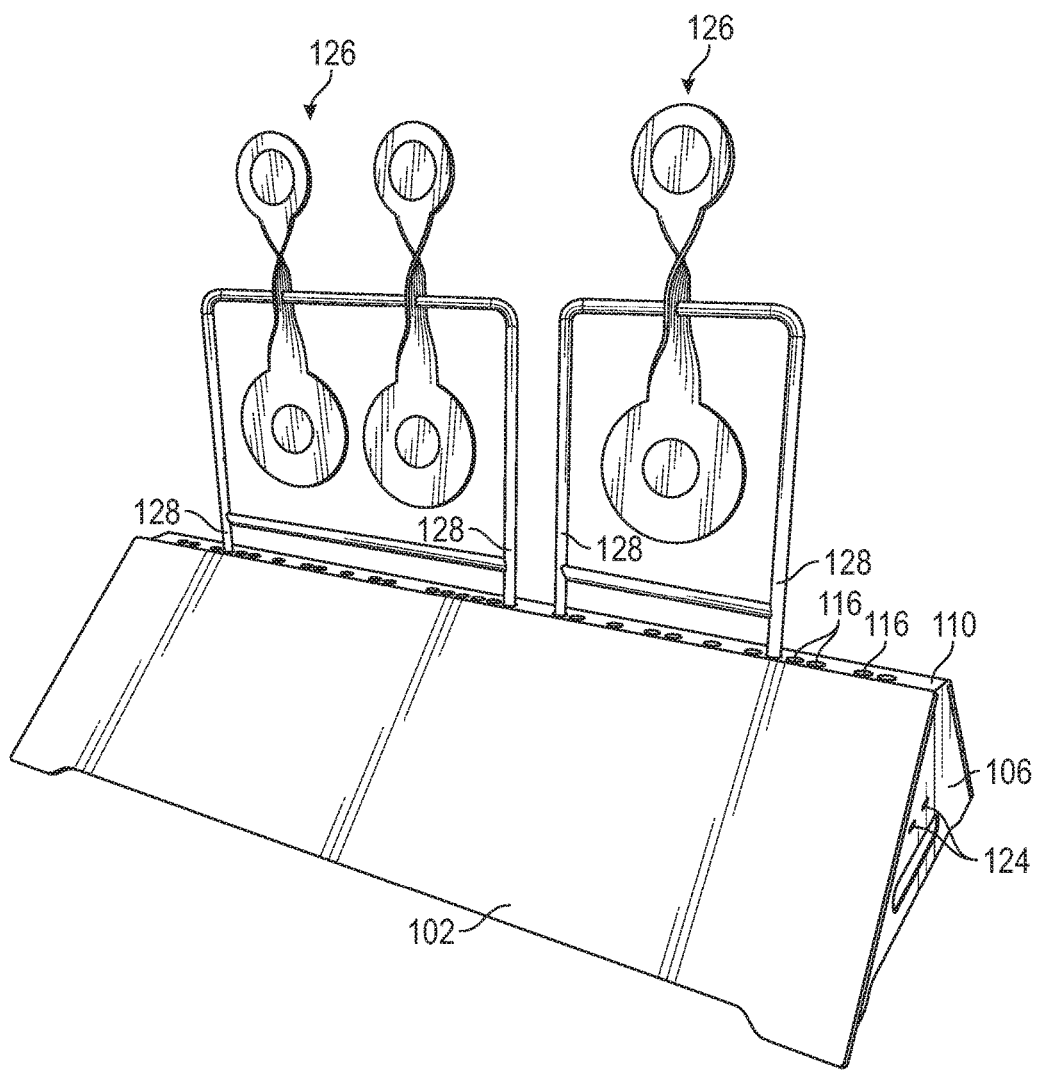
FIG. 5 shows a perspective view of the exemplary base system of FIG. 1 with a shooting target secured thereto.

As shown in FIG. 5, base 100 can receive one or more targets 126. In order to secure targets 126 in base 100, one or more extending members 128 (e.g., legs) of target 126 are passed through openings in the top member 110 and corresponding (i.e., aligned) openings in support member 118. An end (not shown) of the extending members can be supported by the ground after passing through both top member 110 and support member 118.

Alternatively, in some embodiments, the openings in top member 110 can be larger than the openings in support member 118. In this manner, when extensions 110 are provided with a narrowed tip and shoulder arrangement, the entire extending member 128 of a shooting target 126 can pass though openings in top member 110, while only the narrowed tip passes through openings in support member 118, with the shoulder portion of the extending member 128 resting on a top surface of support member 118.

The angled shape of the shooter-facing side (e.g., side 102) is angled to deflect any misplaced bullets. The angle of side 102 relative to the ground is preferably between 25 and 75 degrees, and more preferably between 35 and 55 degrees.

The triangular prism shape of the base 100 provides a stable base without the need for the base to be attached or otherwise secured to the ground. However, if desired, the base could be secured to the ground in any known manner.

In view of the many possible embodiments to which the principles of the disclosure may be applied, it should be recognized that the illustrated embodiments are only examples and should not be taken as limiting the scope of the disclosure. Rather, the scope of the disclosure is defined by the entire contents of this description and the accompanying drawing figures, and additionally by the following claims, as they would be recognized and understood by a person having an ordinary level of skill in the relevant art.

I claim:

1. A target shooting base, comprising:
   a first end member and a second end member;
   a first side extending between the first and second end members, the first side being secured to the first and second end members;
   a second side extending between the first and second end members, the second side being secured to the first and second end members;
   a top member extending between a top portion of first end member and a top portion of the second end member, the top member comprising a plurality of openings; and
   a lower support member extending between an intermediate portion of first end member and an intermediate portion of the second end member, the lower support member comprising a plurality of openings,
   wherein the first end member, the second end member, the first side, and the second side generally define a triangular prism shape, wherein the plurality of openings in the top member are generally vertically aligned with the plurality of openings in the lower support member and wherein the plurality of openings in the top member are larger in diameter than the plurality of openings in the lower support member.

2. The target shooting base of claim 1, wherein the first end member, the second end member, the first side, the second side, and the top member generally define a truncated triangular prism shape.

3. The target shooting base of claim 1, wherein the top member is integrally formed with the first side of the target shooting base.

4. The target shooting base of claim 3, wherein the first side is the shooter-facing side and a thickness of the first side is greater than a thickness of the second side.

5. The target shooting base of claim 1, wherein the lower support member comprises a plurality of tabs extending therefrom and the first end member and the second end member comprise a plurality of corresponding openings configured to receive the plurality of tabs extending from the lower support member to secure the lower support member between the first and second end members.

6. The target shooting base of claim 1, further comprising at least one gripping aperture in each of the first and second end members.

7. The target shooting base of claim 1, wherein the plurality of openings in the top member are spaced apart from one another in a uniform manner.

8. The target shooting base of claim 1, wherein the plurality of openings in the top member are not spaced apart from one another in a uniform manner.

9. The target shooting base of claim 1, wherein the plurality of openings in the top member comprise several sets of different numbers of uniformly-spaced openings that are spaced apart from one another.

10. The target shooting base of claim 1, wherein the plurality of openings in the top member comprise at least 10 openings.

11. The target shooting base of claim 1, wherein the plurality of openings in the top member comprise at least 20 openings.

\* \* \* \* \*